United States Patent [19]

Gibson

[11] 3,757,296

[45] Sept. 4, 1973

[54] DIGIT ERROR DETECTOR

[75] Inventor: Earl D. Gibson, Huntington Beach, Calif.

[73] Assignee: North American Rockwell Corporation, El Segundo, Calif.

[22] Filed: Nov. 15, 1971

[21] Appl. No.: 198,871

[52] U.S. Cl. .......... 340/146.1 AB, 325/41, 325/42, 340/146.1 R

[51] Int. Cl. .......... H04b 1/66, G08c 25/00

[58] Field of Search .......... 325/41, 42; 340/146.1 R, 146.1 AB

[56] References Cited

UNITED STATES PATENTS 3,622,986 11/1971 Tang et al. .......... 340/146.1 R

*Primary Examiner*—Charles E. Atkinson
*Assistant Examiner*—R. Stephen Dildine, Jr.
*Attorney*—L. Lee Humphries, H. Frederick Hamann and Edward Dugas

[57] ABSTRACT

The present invention is a digit error detector for detecting errors in a partial response signalling system wherein digital data signals with an arbitrary number of levels are transmitted through a partial response channel at a baud rate and wherein the received digits have more possible values than the transmitted digits. The digit error detector utilizes a summing means having as an input the signals which are received and sampled by a receiver, which summing means sums these signals with prior received digit signals to provide a present received digit signal at any instant in time the present sampled signal is summed. The prior digit signals are obtained from a feedback means which is connected to the output of the summing means and which feedback means process the present received digit signal in terms of limiting the amplitude of the signal to the maximum amplitude of a possible received signal and by delaying the signal an even multiple of baud intervals before feeding the delayed digit signal back to an input of the summing means. Any errors in the digit signal are then processed around the loop and summed with the most recent signal to provide a signal having an amplitude level above the maximum permitted signal level, the occurrence of which corresponds to an error in the detected signals.

13 Claims, 7 Drawing Figures

INVENTOR
EARL D. GIBSON
BY Edward Dugas
ATTORNEY

INVENTOR
EARL D. GIBSON

BY Edward Dugas
ATTORNEY

INVENTOR
EARL D. GIBSON

BY Edward Dugas
ATTORNEY

DIGIT ERROR DETECTOR

BACKGROUND OF THE INVENTION

1. Field of the Invention

This invention relates to the high speed transmission of digital data over transmission channels of limited bandwidth. When multilevel digital data signals are transmitted through baseband channels at high rates of speed, successive impulses are forced into an overlapping relationship. Various prior art systems have been devised for decoding these overlapped data signals. From time to time, due to noise and other extraneous stray conditions, errors occur in the detection of the data bits that are received. If the error can be detected within a short period of time, the system can automatically ask the transmitter to re-transmit that segment of the transmitted signal in which the error occurred. Obviously the sooner the error is detected and re-transmitted correctly, the faster the total message may be received. In partial response transmission, the transmitted digits, as previously stated, are allowed to overlap in time in order to more efficiently utilize the channel bandwidth. Because of this overlapping, the received digits have more possible values than the transmitted digits.

2. Description of Prior Art

One approach to decoding multilevel digital data signals that are transmitted at high speeds is disclosed in U. S. Pat. No. 3,492,578, entitled "Multilevel Partial-Response Data Transmission," by Gerrish et al. The system disclosed in that patent detects an individual data symbol from the received channel output signal by utilizing analog subtraction of the contributions made by $N-1$ previous samples of the output signal. In the system, $N$ successive samples are stored at the receiver and an algorithn for the subtraction is devised. The correct interpretation of a given sample depends on the correct interpretation of the $N-1$ preceding samples. This interdependency of samples would ordinarily cause error propagation, which is the tendency of one error to start a burst of errors; but, error propagation is overcome by precoding of the input data at the transmitter. The precoder generates a summation of the contributions from $N-1$ successive past input symbols and subtracts them from the present input symbols. The precoded data, in passing through the channels, has the same contributions restored, and each received sample is then related to only one message symbol. Simplified, the procedure of precoding and decoding, which is matched to the known channel impulse response, causes the received signals at sampling instants to be independent of samples taken at other sampling instants and this eliminates error propagation in the decoding. The encoding-decoding schemes of that patent do not detect when an error has occurred; whereas, the applicant's present invention does. Another problem with the systems of that patent is that the impulse response of the transmission system must be known to a fair degree of accuracy. Applicant's present invention does not require this additional information.

Many error detection techniques have been devised. Nearly all of them require adding redundant digits to the transmitted data stream. The addition of redundant digits reduces the useful data rate (information rate) that can be achieved on any given channel without resorting to an increase in the number of signals used. Any increase in the number of signals causes a large increase in the error rate by making the signaling more susceptible to noise and other transmission disturbances. This increase in error rate is often so damaging that it more than offsets the value of the error detection.

The applicant's present invention circumvents these problems by detecting errors without requiring any redundant digits to be added to the transmitted data stream. With this invention, error detection can be achieved when all transmitted digits carry useful information for purposes other than error detection.

Another prior art patent of interest is U. S. Pat. No. 3,204,189, entitled "Error Detecting System for Pulse Communication Systems," by G. Trautwein. The system covered by that patent essentially provides two identical signal paths for the pulse signals with one path having the signal inverted. The inverted and non-inverted signals are then compared and when a difference occurs, this difference must have then been caused by an error. An error signal is then generated as an output of the system. This approach requires 100 percent digit redundancy by requiring the two transmission channels.

Another patent of interest is U. S. Pat. No. 3,496,477, entitled "Clock Pulse Failure Detector," by E. S. Page. The circuit of that patent discloses a system wherein a clock pulse is fed to input ports of a passive network with one port being supplied directly from the clock while the other is supplied through a half-period delay. If the clock pulse fails altogether, the output from the network promptly drops to zero to activate an alarm. As is often the case, it is not the complete absence of the pulse that causes an error but, for an example, an extra pulse being generated by extrinsic noise acting on the system, which error pulse gives an indication that a signal has been transmitted when, in fact, none has. Applicant's system attempts to solve the particular problem that is more normally associated with high speed systems, namely of presence of a pulse when, in fact, no pulse has been transmitted.

Detecting missing or extra pulses in a clock pulse train is basically a very different problem from detecting errors in an ordinary data signal. In a clock pulse train, the relative polarities of adjacent pulses are known apriori. The detection scheme can take advantage of this apriori knowledge. In the data signal, such apriori knowledge cannot exist because pulses with polarities fixed apriori carry no information. The present invention requires no apriori knowledge concerning transmitted pulse polarities. This invention detects errors in evaluating digits which is different from detecting missing or extra pulses in a pulse system of approximately fixed rate.

Another patent of interest is U. S. Pat. No. 3,458,822, entitled "Clock Pulse Failure Detector," by J. R. Hahn, Jr. In that patent, similar to the one previously discussed, a clock generator provides a train of pulses which alternate between two voltage states and which train of pulses is applied to transmission channels. The pulse train on one channel is made one-half the clock period out of phase with the pulse train on the other channel. Each channel also includes a means for deriving an additional pulse train of the same frequency, but each shifted in phase. All four pulse trains are then applied to the input circuit of a logic gate which delivers an output pulse only when the pulses of all four trains are in a selected one of their two states.

If the clock circuit fails, all four pulse trains will quickly assume the selected state delivering the indicated error signal as an output. Applicant's device, in addition to detecting when an error has occurred in a particular received signal, also provides an indication of whether the error is in a positive or negative direction and, in addition, applicant's device can also determine if the error occurred in an even or odd digit of the data train.

SUMMARY OF THE INVENTION

The present error detector is adapted to be used in a system utilizing partial response signalling in which received digits have more possible values than transmitted digits and wherein the transmitted digits are transmitted at a baud rate which causes the received digit signals to overlap in time. A summing means receives as an input the system's received digits and a feedback means is connected from the output of the summing means back to an input to the summing means so as to limit the amplitude of the summing means' output signal and to delay the output signal by an even multiple of baud intervals before the output signal is fed back to the input of the summing means. In the summing means, the fed back signal is added to the received signal. If an error occurs in the received signal, it will be fed back and added to the latest received signal such that within a short period of time, the output of the summing means will reach a level which is above the possible level of received signals. A digit level detecting means is then connected to the output of the summing means to provide an error indicating signal whenever the output of the summing means has an amplitude value above the greatest amplitude of all possible received signals.

In a second embodiment of the invention, one digit level detector is provided for positive going signals and a second digit level detector is provided for negative going signals such that when the amplitude reaches a predetermined maximum in either direction, an error indicating signal is provided which indicating signal effectively identifies the polarity of the error digit.

In a third embodiment of the invention, alternating switches are connected to the output of the level detectors, which switches are operated at the transmitted baud interval so that every second pulse error signal appears on one output terminal of the switches and every intermediary pulse appears on an opposite terminal. This particular arrangement of switches, operating at the transmitted data rate, provides an indication of whether the error is in an odd or even bit time interval and, in addition, whether the error is in a plus or minus direction.

It is, therefore, a primary object of the present invention to provide an error detector and polarity indicator that requires no digit redundancy other than the redundancy inherent in partial response signalling.

It is another object of the present invention to provide a system that detects nearly all errors in partial response signalling schemes.

It is another object of the present invention to provide an error detector of quick response, which detector can provide an indication of the polarity and whether the error occurred in an even or odd baud time period.

The aforementioned and other objects of the present invention will become more apparent when taken in conjunction with the following description and drawings throughout which like characters indicate like parts and which drawings form a part of this application.

DESCRIPTION OF THE PREFERRED EMBODIMENTS OF THE INVENTION

Figure 1:
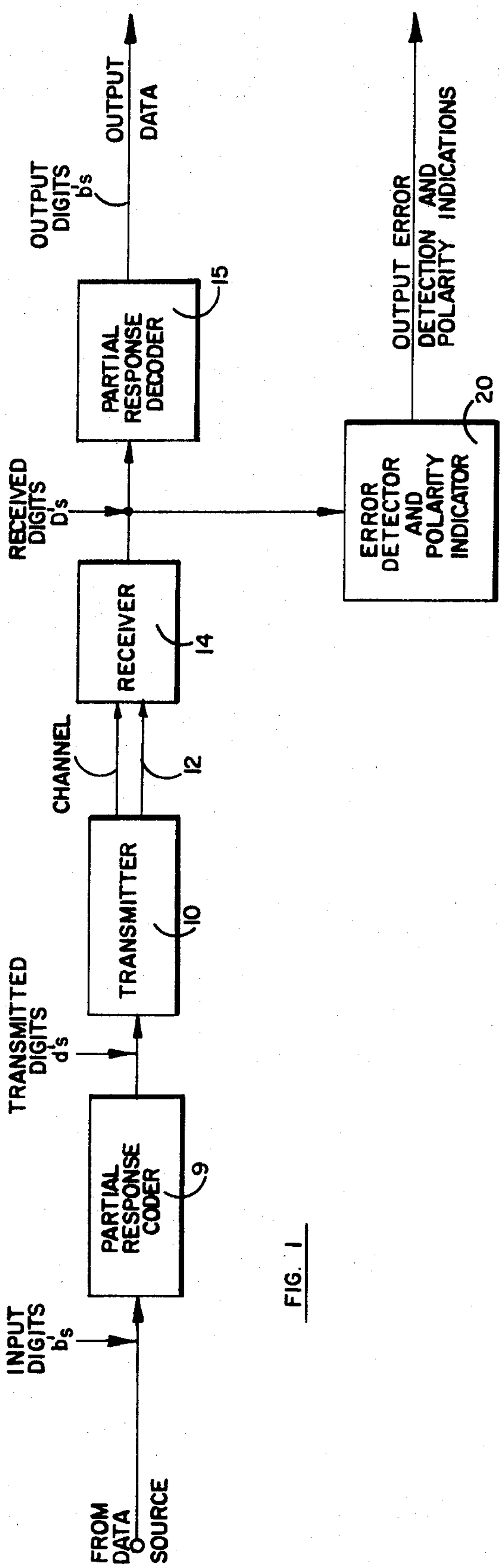
FIG. 1 is a system block diagram illustrating a typical partial response system in which the error detector with polarity indication is used.

FIG. 1 illustrates a typical system of the partial response type. Input digits, designated *b*, are fed to a partial response coder 9, which coder prepares the digits for transmission over a transmission channel 12, taking into account the impulse response of the entire system. The prepared digits are designated *d*. The *d* digits are then fed from the partial response coder to a transmitter 10 and from there they are fed out across the transmission channel 12. The transmission channel 12 is generally a telephone or radio channel. A receiver is connected at the opposite end of the transmission channel. The receiver samples the received signal at a selected rate to provide a signal, D, which signal is a function of the transmitted digits, *d*. The received digits, D, are then fed to the error detector and polarity indicator 20 and to a partial response decoder 15. The partial response decoder 15 transforms the D signals into the output digits, *b*, which digits ideally correspond to the input digits, *b*, fed into the partial response coder 9. The *b* signals can take a binary form, wherein the marked bits (presence of a pulse) are called ones, and spacing bits (absence of a pulse) are called zeros. The *b* digits may also take the multilevel form, for example, a four-level signal. Multilevel pulse encoding is used when it is desired to exceed the maximum practical binary data transmission rate over band-limited facilities. The symbol rate, however, remains limited according to the well-known theories of Nyquist, but the effective serial data bit rate is increased above this limit by converting the high speed binary signals into the multilevel form. The end result is that each symbol represents a plurality of binary data bits. The decoding of these multilevel signals does require additional protection against intersymbol interference which tends to cause errors. The transmission channel 12, in most case, is a voice-grade telephone line which, of course, makes that channel baud-limited. In systems of this type, the primary cause of errors is impulse or transient noise.

Figure 2:
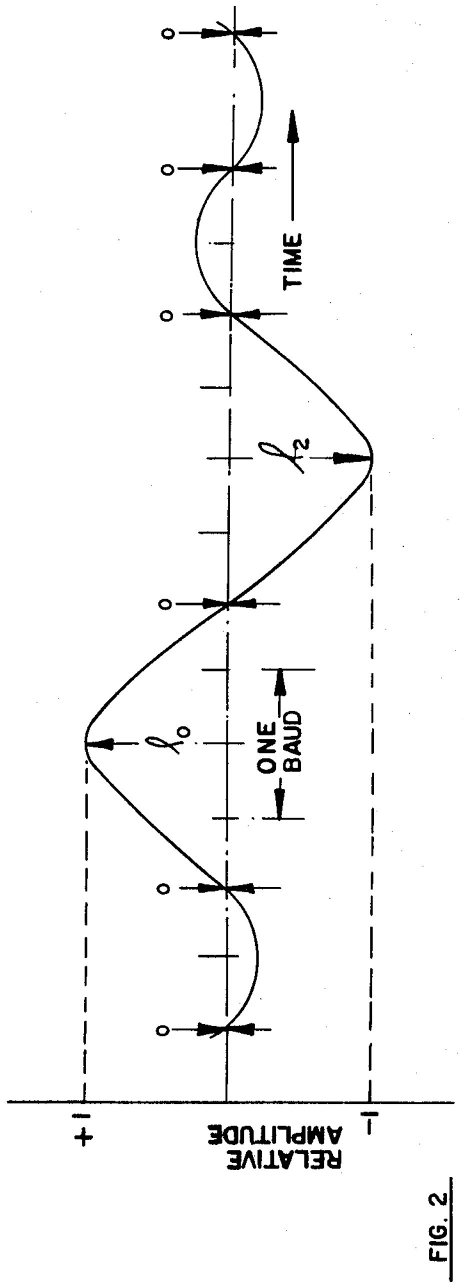
FIG. 2 is a waveform illustrating the idealized transmission system pulse response for use in a particular type of partial response signalling.

A typical transmission system pulse response is illustrated in FIG. 2. The transmitter transmits digits at a baud rate and the receiver samples the received signal at the baud rate. In this particular type of response, there are two major samples. These are designated $l_o$ and $l_2$. For the pulse response shown in FIG. 2, we have one sample amplitude, $l_o$, at a normalized +1. The next sample is at zero, with the next sample being at a normalized −1. All other samples are ideally of zero amplitude. As has been previously stated, in partial response transmission systems, the transmitted digits are allowed to overlap in time in order to more efficiently utilize the channel bandwidth. If this were not the case, all of the ringing out or tailing terms would have to be allowed to diminish to a negligible value before another digit could be transmitted. Because of this overlapping, the received digit signal, D, has more possible values than the transmitted digit, *d*.

In FIG. 2, the signal received for one isolated digit is ideally the pulse response shown, multiplied by the pulse amplitude $d_i$ for the $i^{th}$ digit that was transmitted. We assume the case first where $d_i$ has four possible values: ±1 and ±3. Then, because the pulse response has two main sample amplitudes, $l_o$ and $l_2$, wherein $-l_2$ equals $l_o$, and because the sampling is occurring at the transmitted digit rate, the $i^{th}$ received signal sample $y_i$ is approximately $$y_i = l_o d_i + l_2 d_{i-2} = l_o\ (d_i - d_{i-2}) = l_o D_i \qquad \text{Eq. (1)}$$

where $$D_i = d_i - d_{i-2} \qquad \text{Eq. (2)}$$

the seven possible values of $D_i$ are: 0, ±2, ±4 and ±6.

From each $y_i$ the receiver makes a decision $\hat{D}_i$. Based upon Equation (2), the error detector makes an estimate $\hat{d}_i$ concerning each 4-level digit value $d_i$, using the following relationship:

$$\hat{d}_i = \hat{D}_i + \hat{d}_{i-2} \qquad \text{Eq. (3)}$$

where the symbol ^ designates an estimated value.

Suppose an error of +2 occurs in $\hat{D}_i$. From Equation 3, this error will cause a +2 error in $\hat{d}_i$. Since the only allowed values of $\hat{d}_i$ are ±1 and ±3, there is one chance in four that the error will be detected immediately, because if the correct $d_i$ is +3, the +2 error will cause $d_i$ to go to an unallowed value immediately. Furthermore, until the error is detected, it will continue to propagate in every second baud, i.e., there will be a +2 error in each digit of the sequence $\hat{d}_i$, $\hat{d}_{i+2}$, $\hat{d}_{i+4}$ ... until an estimated digit value of +5 occurs. When this occurs, the error detector is designated to generate a pulse to indicate that a positive error has occurred somewhere in the preceding even-numbered bauds. Then, the estimated digit value is changed from +5 to +3 to stop the error propagation and prepare for detection of the next error. Similarly, a negative error is detected when the estimated digit value goes below −3.

Figure 3:
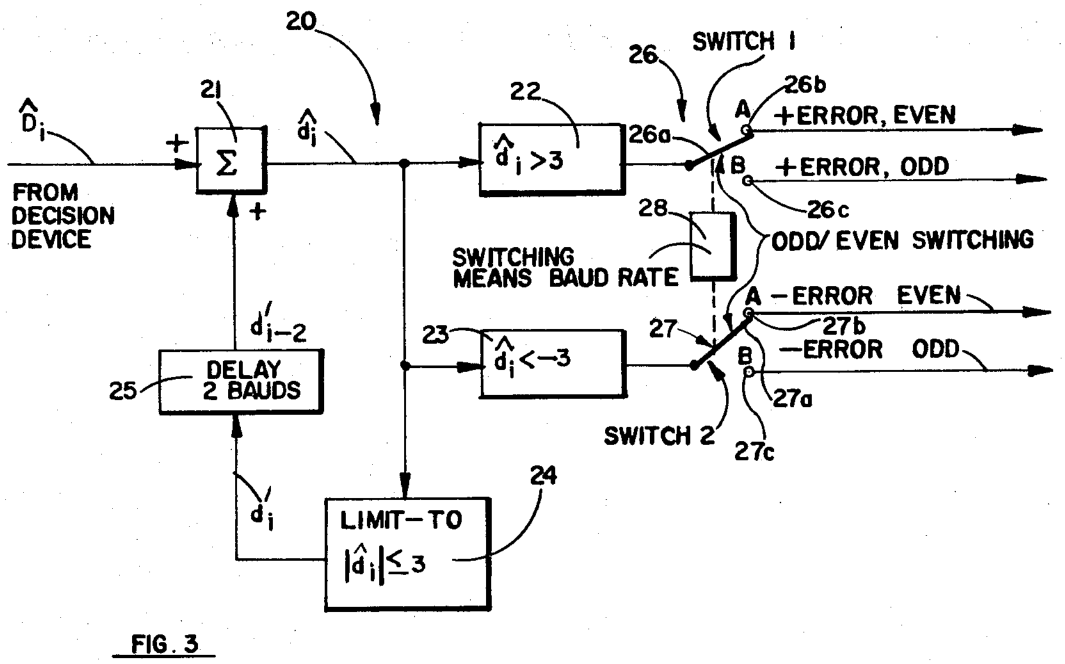
FIG. 3 is a block diagram of a preferred embodiment of the error detector and polarity indicator used for the type of partial response of FIG. 2.

FIG. 3 presents the implementation of the error detector and polarity indicator for the particular method of partial response described above. In this particular embodiment, it is assumed that the received digits from the decision device in receiver 14 are of the seven-level digit type. The sequence of digit decisions $\hat{D}_i$ enter the summation device 21 and are summed with the detected digit $d'_{i-2}$ which digit occurred two baud time intervals prior to the most recently received signal. The output of the summing device 21 is then, according to Equation (3), the desired most recently received digit $\hat{d}_i$. The desired digit $\hat{d}_i$ in this case, is a four-level digit decision. When no error has occurred in the digit estimate $\hat{d}_i$, it passes unchanged through a limiting device 24. If digit estimate $\hat{d}_i$ were to have an absolute value greater than three, the maximum possible absolute value for this particular seven-level coding used, the signal would automatically be limited in amplitude to be ±3.

The limiting device 24 (or "limit-to $|\hat{d}_i| \leq 3$" device) in FIG. 3 is a device that performs the following functions:

When $-3 \leq \hat{d}_i \leq +3$ set $d'_i = \hat{d}_i$

When $\hat{d}_i > +3$ set $d'_i = +3$

When $\hat{d}_i < -3$ set $d'_i = -3$ where $\hat{d}_i$ and $d'_i$ are the input and output of this device, respectively, it is straightforward to implement such a device in digital hardware.

The output from the limiting device 24 is then fed to a delay means 25 which, for this particular type of coding, delays the signal $d'_i$ two baud intervals of time to create the signal $d'_{i-2}$, which signal is fed back to the summation device 21.

Whenever a digit error occurs in one of the seven-level input decisions, $\hat{D}_i$, it causes an equal error in the four-level digit $\hat{d}_i$ at the output of the summation device. This error propagates around the loop, causing the same error in every second subsequent four-level digit, $\hat{d}_i$, $\hat{d}_{i+2}$, $\hat{d}_{i+4}$ etc. until the absolute value of some four-level digits at the output of the summation device exceeds +3; at that occurrence, a level detector device 22 generates a pulse, indicating that a positive error has occurred at some integer multiple of two bauds earlier. When the output of a summation device falls below −3, the level detector device 23 generates a pulse, indicating that a negative error has occurred at some integer multiple of two bauds earlier.

In further explanation, the limit device 24 operates in a way such that when the output from the summation device exceeds +3, the limit device sets its output, $d'_i$ to a +3 value. Similarly, when the output of the summation device drops below −3, the limit device sets its output $d'_i$ to −3. Thus, whenever the absolute digit value of $\hat{d}_i$ exceeds 3, the limit device changes the digit estimate. When this happens, the summation device implements the equation $$\hat{d}_i = \hat{D}_i + d'_{i-2} \qquad \text{Eq. (4)}$$

instead of, for example, Equation (3). This, in turn, stops the error propagation around the loop.

Switches 26 and 27 are connected to receive the output of threshold devices 22 and 23, respectively. A switch driving means 28 is connected to the movable arm 26*a* and 27*a* of switches 26 and 27, respectively. The switch driver moves the arms 26*a* and 27*a* alternately at a rate corresponding to the baud transmission rate. The received baud time intervals are arbitrarily divided into odd and even intervals, the odd/even designation being synchronized with the receiver baud timing. By means of these switches, the error detector gives separate error detection signals for even and odd baud intervals on terminals 26*b*, 26*c*, 27*b* and 27*c*. The switches, 26 and 27, are shown in a mechanical form, but in the actual implementation, these switches are of the electronic type.

In FIG. 3, in all blocks where the number 3 appears, this number applies to the four, seven-level method of partial response described above. This same basic method of partial responses, which will be called "Type 1 Partial Responses", can be used with different numbers of signal levels; and, the device shown in FIG. 3 can be used with any set of numbers of possible signal levels in type 1 partial responses by merely using a different number instead of three for each set of possible signalling levels. The following table lists the number to use in the blocks of FIG. 3 for various numbers of signal levels.

TABLE 1

| Numbers of Signal Levels | Possible Correct Values of $d_t$ | Possible Correct Values of $D_t$ | Type of Partial Responses | Number to use in place of 3 in blocks 22, 23 and 24 |
|---|---|---|---|---|
| 2, 3 | ±1 | 0, ±2 | Binary, Type 1 | 1 |
| 3, 5 | 0, ±2 | 0, ±2, ±4 | Ternany, Type 1 | 2 |
| 4, 7 | ±1, ±3 | 0,±2,±4,±6 | Quaternary, Type 1 | 3 |
| 8, 15 | ±1, ±3, ±5, ±7 | 0, ±2, ±4, ±6, ±8, ±10, ±12, ±14 | 8-Level, Type 1 | 7 |

Figure 4:
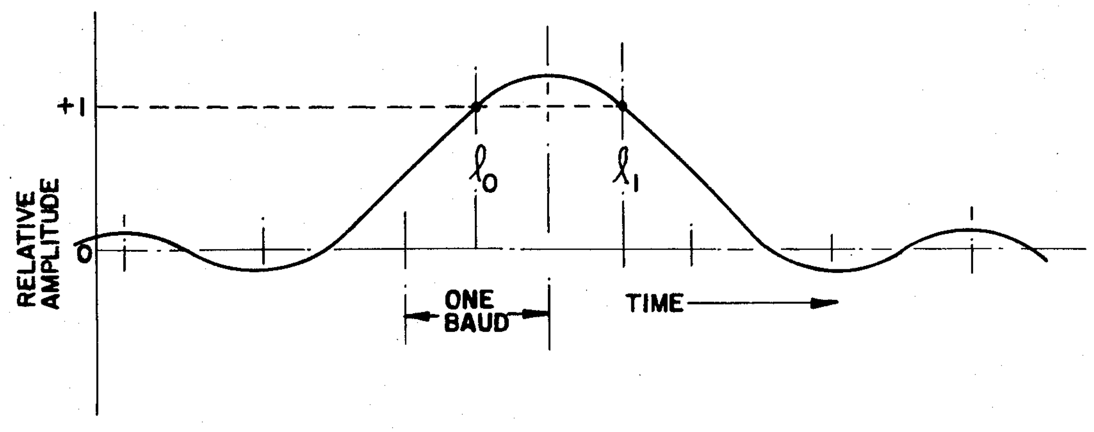
FIG. 4 illustrates a waveform of an idealized transmission system pulse response used with a second type of partial response signalling.

FIG. 4 shows the shape of pulse response used in another type of partial response signalling which response will be called the Type 2 Partial Response herein. This pulse response has two main samples, $l_0$ and $l_1$, of relative amplitudes 1, with the other samples of the pulse response being ideally zero. In this type of partial responses, the basic equation for implementing the error detector is $$\hat{d}_t = \hat{D}_t - d'_{t-1} \qquad \text{Eq. (5)}$$

instead of Equation (4).

Figure 5:
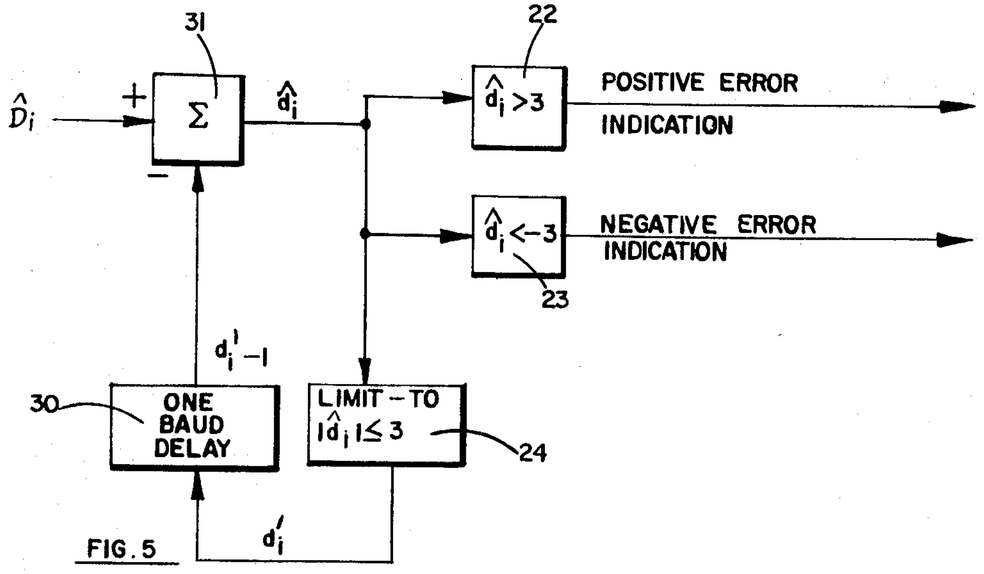
FIG. 5 illustrates in block diagram form a second preferred embodiment of an error detector and polarity indicator used for the type of partial response of FIG. 4.

Referring now to FIG. 5 wherein an embodiment adapted to the Type 2 partial response signalling is shown. The embodiment of FIG. 4 is substantially identical to the embodiment of FIG. 3, with two exceptions. One is that the summation means 31 now subtracts the fed back signal from the decision signal $\hat{D}_t$. Second, there is a one-baud delay means 30 for delaying the digit signal $d'_t$. The numbers provided in Table 1 also apply to the Type 2 partial response coding for this particular embodiment. This particular embodiment solves Equation (5) instead of Equation (4).

Figure 6:
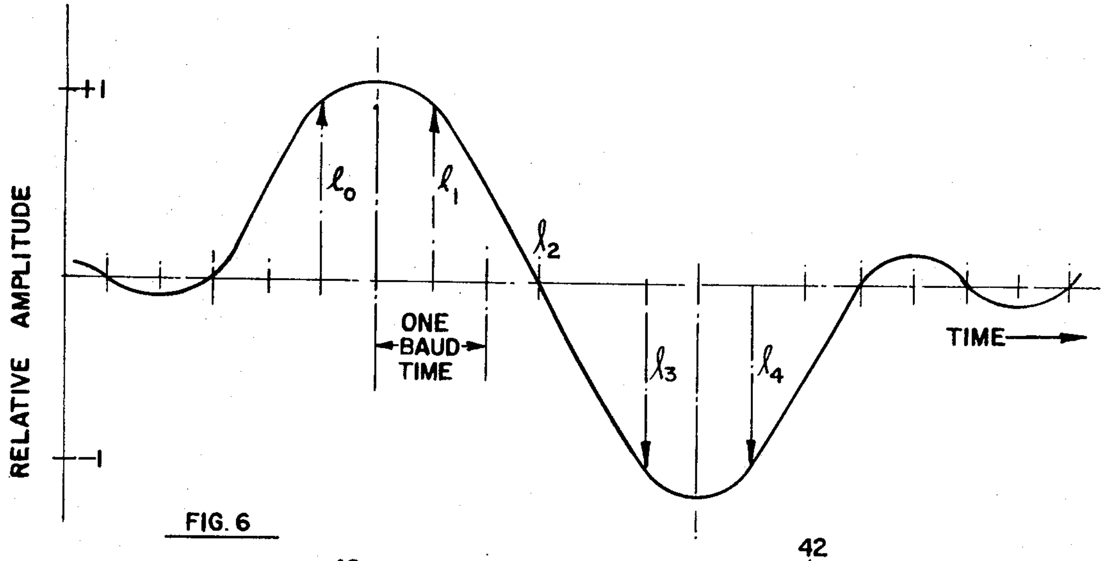
FIG. 6 illustrates a waveform of an idealized transmission system pulse response used with a third type of partial response signalling.

FIG. 6 illustrates a third type of impulse response wherein four major samples appear with two pairs being of opposite polarity.

Figure 7:
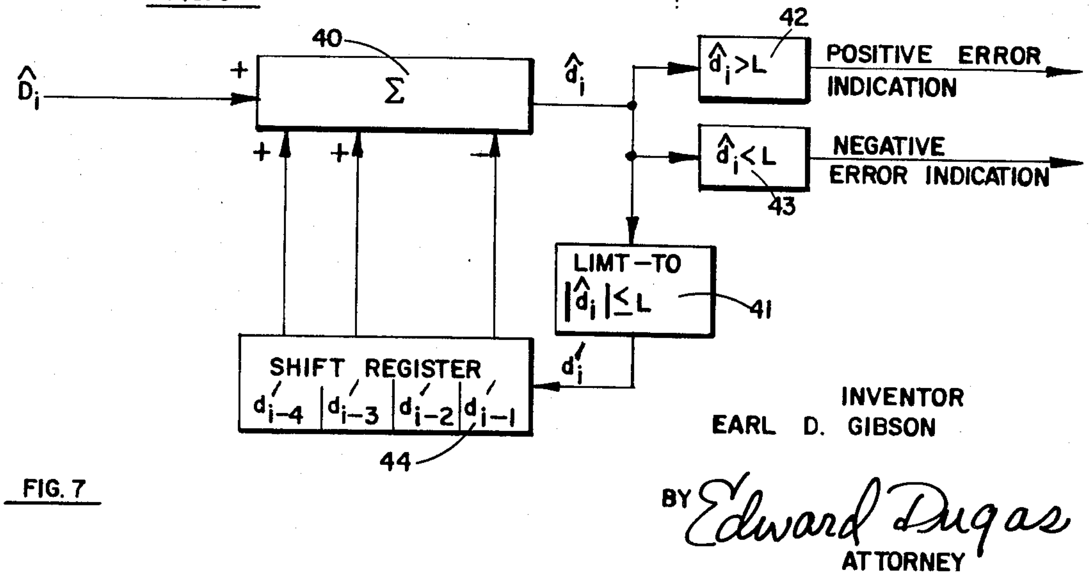
FIG. 7 illustrates in block diagram form a third preferred embodiment of an error detector and polarity indicator and used for the type of partial response of FIG. 6.

Referring now to FIG. 7 wherein there is shown a third embodiment of the invention which is used in conjunction with systems having the third type of impulse response. In the FIG. 7 embodiment, the summing means 40 sums the signal $\hat{D}_t$ with the signals $d'_{t-4}$, $d'_{t-3}$ and subtracts the signal $d'_{t-1}$ to provide the output signal $\hat{d}_t$. The $\hat{d}_t$ signal is then fed to a limiter 41 which limits the value of $d'_t$ to be either less than or equal to a value $L$. The value $L$ is the largest correct value of $d_t$ in whatever signalling radix is used. Table 2 sets forth the values of $L$ for some possible signalling schemes.

TABLE 2

| Possible Correct Signaling Levels (Values of $d_t$) | Value of $L$ | Allowed, Correct Values of $D_t$ |
|---|---|---|
| +1 | 1 | 0, ±2, ±4 |
| ±1, ±3 | 3 | 0, ±2, ±4, ±6, ±8, ±10, ±12 |
| ±1, ±3, ±5 | 5 | 0, ±2, ±4, ±6, ±8, ±10, ±12, ±14, ±16, ±18, ±20 |

The basic equation used in implementation of the FIG. 6 error detector is $$\hat{d}_t = \hat{D}_t - d'_{t-1} + d'_{t-3} + d'_{t-4} \qquad \text{Eq. (6)}$$

The output of the limit device 41, which is the digit $d'_t$, is then fed to a shift register 44 which shift register stores the preceding four digit samples. The output of three stages of the shift register is then fed back to the summation device 40 in the previously described manner.

The described error detectors for Type 1 partial response will detect all errors with essential certainty except when an error of one polarity is followed by an error of the opposite polarity before the first error is detected. This particular type of error detection failure occurs rarely.

For a single error, the probability that an error will remain undetected for more than $2N$ bauds is given approximately by Table 3.

TABLE 3

| Number of Possible Values of $d_t$ | Prob. Error Goes Undetected for More than 2N Bauds |
|---|---|
| 2 | $(1/2)^N$ |
| 3 | $(2/3)^N$ |
| 4 | $(3/4)^N$ |
| 6 | $(5/6)^N$ |
| 8 | $(7/8)^N$ |
| 16 | $(5/16)^N$ |

In Table 4, there is set forth examples of probability of failure to detect the error within $N$ even (or odd) bauds after a ±2 error occurs in an even (or odd) baud in Type 1 partial response signalling.

TABLE 4

| Number of Values of $d_t$ | N | Probability that the error goes undetected for more than N even (or odd) Bauds |
|---|---|---|
| 2 | 1 | ½ |

| | | |
|---|---|---|
| | 2 | ¼ |
| | 10 | $2^{-10} = 1/1024$ |
| | 15 | $2 \times 10^{-5}$ |
| | 20 | $10^{-6}$ |
| | 25 | $3 \times 10^{-8}$ |
| | 30 | $9 \times 10^{-10}$ |
| 3 | 10 | 0.024 |
| | 20 | $5.5 \times 10^{-4}$ |
| 4 | 2 | 9/16 = 0.552 |
| | 5 | 0.236 |
| | 10 | 0.056 |
| | 15 | 0.027 |
| | 20 | $3.2 \times 10^{-3}$ |
| | 25 | $7.5 \times 10^{-4}$ |
| | 30 | $1.8 \times 10^{-4}$ |
| | 35 | $4.2 \times 10^{-5}$ |
| | 40 | $10^{-5}$ |

As mentioned above, the only cause of a complete detection failure is the occurrence of two errors of opposite polarity, with the second error occurring before the first error is detected. The probability of this occurring depends upon the signal-to-noise ratio.

Table 5 sets forth examples for four-level partial response signalling:

TABLE 5

| Signal-to-Noise (db) | Probability of Detection Failure |
|---|---|
| 18 | $1.5 \times 10^{-4}$ |
| 20 | $1.5 \times 10^{-6}$ |
| 21 | $1.5 \times 10^{-8}$ |
| 21.8 | $1.5 \times 10^{-10}$ |
| 22.5 | $1.5 \times 10^{-12}$ |

It should be kept in mind that this is the probability of detection failure given that an error has occurred. The overall probability of error and failure to detect is the product of the error probability and the detection failure probability, which product is generally exceedingly small. Similar relationships apply to other methods of partial response.

I claim:

1. An error detector for detecting errors in a partial response signalling system wherein the received digits have more possible values than the transmitted digits and wherein the transmitted digits are transmitted at a baud rate, comprising in combination:

*a.* a summing means having as an input the system's received digits;

*b.* a feedback means connected to receive the output of said summing means and to limit the amplitude of the received output signal and to delay the output signal an even multiple of baud intervals before feeding the output signal back to an input of said summing means to be summed with the latest received digits; and

*c.* digit level detecting means connected to receive the output signals from said summing means for providing an error signal when the output signals are above a known possible value.

2. The error detector according to claim 1 wherein said digit level detecting means is comprised of:

*a.* a first digit level detector connected to receive said output signal for providing a first error signal when the output signal is greater in a positive direction than any possible correct value; and

*b.* a second digit level detector connected to receive said output signal for providing a second error signal when the output signal is greater in a negative direction than any possible correct value.

3. The error detector according to claim 2 and further comprising:

*a.* a first and a second switch means, each switch means having an odd output terminal and an even output terminal, for connecting the first and second error signals respectively, first to a corresponding odd terminal and second to a corresponding even terminal, said switches operating at the baud rate of the transmitted digits to provide an indication of whether the signals are occurring at an even or odd baud interval.

4. An error detector for detecting errors in a partial response signalling system wherein the received digits have more possible values than the transmitted digits and wherein the transmitted digits are transmitted at a baud rate, comprising in combination:

*a.* a summing means having as an input the system's received digits;

*b.* a feedback means connected to receive the output of said summing means and to limit the absolute amplitude of the received output signal and to delay the received output signal for different baud intervals before feeding the delayed signals back to inputs of said summing means to be summed with the latest received digits; and

*c.* digit level detecting means connected to receive the output signals from said summing means for providing an error signal when the output signals are above a known possible value.

5. The error detector according to claim 4 wherein said feedback means is comprised of:

*a.* a limiter for receiving the output of said summing means and to limit the absolute amplitude of said output to the largest absolute amplitude of a possible correct value; and

*b.* a multistaged shift register for receiving the signal from said limiter and for delaying said signal through each stage of said shift register wherein each stage corresponds to one baud interval of delay and where the signals present in desired stages of said shift register are fed as inputs to said summing means.

6. The error detector according to claim 4 wherein said digit level detecting means is comprised of:

*a.* a first digit level detector connected to receive said output signal for providing a first error signal when the output signal is greater in a positive direction than a possible correct value; and

*b.* a second digit level detector connected to receive said output signal for providing a second error signal when the output signal is greater in a negative direction than a possible correct value.

7. An error detector for detecting errors in a partial response signalling system wherein the received digits are designated $D_t$ and have more possible values than the transmitted digits designated $d_t$, and wherein the transmitted digits are transmitted at a baud rate, comprising in combination:

*a.* a summing means for summing the received digit estimate $\hat{D}_t$ with a digit estimate $d'_{t-2}$, which latter digit estimate was made two baud intervals prior to the received digit estimate $\hat{D}_t$, to form the presently transmitted digit estimate $\hat{d}_t$;

*b.* feedback means connected to receive the output digit estimate $\hat{d}_t$ of said summing means and to limit the absolute amplitude of said $\hat{d}_t$ signal to the maximum absolute amplitude of the possible transmitted digits and to delay said limited signal two baud intervals to form the signal $d'_{i-2}$, said feedback means feeding said $d'_{i-2}$ signal back to an input of said summing means: and

*c.* digit level detecting means connected to receive said $\hat{d}_i$ signal from said summing means and to provide an error signal when the amplitude of the $\hat{d}_i$ signal is above the known possible values.

8. The error detector according to claim 7 wherein said digit level detecting means is comprised of:

*a.* a first digit level detector connected to receive said digit signal $\hat{d}_i$ and for providing a first error signal when the signal, $\hat{d}_i$, is greater in a positive direction than any possible correct value; and

*b.* a second digit level detector connected to receive said digit signal $\hat{d}_i$, and for providing a second error signal when the signal $\hat{d}_i$ is greater in a negative direction than any possible correct value.

9. The error detector according to claim 8 and further comprising:

a first and a second switch means, each switch means having an odd output terminal and an even output terminal, for connecting the first and second error signals, respectively, first to a corresponding odd terminal and second to a corresponding even terminal, said switches operating at the baud rate of the transmitted digits to provide an indication of whether the signals are occurring at an even or odd baud interval.

10. An error detector for detecting errors in partial response signalling system wherein the received digits have more possible values than the transmitted digits, wherein the transmitted digits are transmitted at a baud rate, and wherein the single pulse response of the system establishes for each transmitted pulse a first non-zero amplitude sample and at least one successive non-zero amplitude sample, each such successive sample being delayed relatively to a first sample by a corresponding and predetermined integral multiple of the baud interval, comprising in combination:

*a.* a summing means having an an input the system's received digits;

*b.* a feedback means connected to receive the output of said summing means and including means to limit the absolute amplitude of the output signal of said summing means, means to delay each said output signal by each said corresponding and predetermined integral multiple of the baud interval, and means to supply each such delayed output signal in a predetermined polarity, in accordance with the single pulse response of the signalling system, to said summing means for combination with each received digit; and

*c.* digit level detecting means connected to receive the output signals from said summing means for providing an error signal when the output signals are above a known possible value.

11. An error detector as recited in claim 10 wherein said single pulse response includes only one successive non-zero sample delayed from a first sample by two baud intervals, for each transmitted pulse, and wherein said delay means delays each output signal of said summing means by two baud intervals, and said supply means supplies the delayed output signal in a polarity for additive combination with each received digit.

12. An error detector as recited in claim 10 wherein said single pulse response includes only one successive non-zero sample delayed from a first sample by a single baud interval, for each transmitted pulse, and wherein said delay means delays each output signal of said summing means by a single baud interval, and said supply means supplies the delayed output signal in a polarity for subtractive combination with each received digit.

13. An error detector as recited in claim 10 wherein said single pulse response includes three successive non-zero samples delayed from a first sample by one, three and four baud intervals, for each transmitted pulse, and wherein said delay means delays each output signal of said summing means by four successive baud intervals to provide delayed signals of said one, three and four baud intervals of delay, said supply means supplies the delayed output signals in a polarity for subtractive combination, as to the one baud delayed signal, and additive combination as to the three and four baud delayed signals, with each received digit.

* * * * *